United States Patent
Shen

(10) Patent No.: US 7,333,413 B2
(45) Date of Patent: Feb. 19, 2008

(54) OPTICAL STORAGE DEVICE ROTATION SPEED CONTROL APPARATUS AND METHOD

(75) Inventor: Po-Jen Shen, Hsin-Chu (TW)

(73) Assignee: MediaTek Inc., Hsin-Chu Hsien (TW)

( * ) Notice: Subject to any disclaimer, the term of this patent is extended or adjusted under 35 U.S.C. 154(b) by 98 days.

(21) Appl. No.: 11/380,214

(22) Filed: Apr. 26, 2006

(65) Prior Publication Data

US 2006/0203666 A1 Sep. 14, 2006

Related U.S. Application Data

(63) Continuation of application No. 10/250,251, filed on Jun. 18, 2003, now Pat. No. 7,116,622.

(30) Foreign Application Priority Data

Jun. 26, 2002 (TW) ............................. 91114031 A

(51) Int. Cl.
*G11B 7/00* (2006.01)
(52) U.S. Cl. .................. 369/53.3; 369/47.55; 369/47.4
(58) Field of Classification Search ...................... None
See application file for complete search history.

(56) References Cited

U.S. PATENT DOCUMENTS

| | | | |
|---|---|---|---|
| 4,672,595 A | 6/1987 | Senso | |
| 4,710,683 A * | 12/1987 | Bahn et al. | 318/254 |
| 4,719,400 A | 1/1988 | Kurakake et al. | |
| 5,396,159 A * | 3/1995 | Kaneda | 318/431 |
| 5,451,846 A * | 9/1995 | Peterson et al. | 318/254 |
| 5,616,994 A * | 4/1997 | Nagaoka et al. | 318/254 |
| 5,777,447 A * | 7/1998 | Okano | 318/434 |
| 5,798,623 A * | 8/1998 | El-Sadi | 318/254 |
| 6,122,234 A * | 9/2000 | Fujitani et al. | 369/47.4 |
| 6,528,967 B2 * | 3/2003 | Hallidy | 318/808 |

\* cited by examiner

*Primary Examiner*—Wayne Young
*Assistant Examiner*—Van T Pham
(74) *Attorney, Agent, or Firm*—Winston Hsu

(57) ABSTRACT

A method for controlling the rotation speed of an optical storage device. In the first mode, a first signal is produced, and in the second mode, a second signal is produced. In one mode, a first pulse of a first voltage and a second pulse of a second voltage are sent to the motor, which causes the motor to produce a first armature current and a second armature current. In another mode, a DC signal of a third voltage is produced, which causes the motor to produce a third armature current. The armature currents are detected, and test voltages are outputted. The first and second voltages, and the first and second test voltages are used to find a motor coefficient. The third voltage, the motor coefficient, and the third test voltage are used to calculate a motor rotation speed. The calculated speed is used to control the real motor speed.

12 Claims, 4 Drawing Sheets

OPTICAL STORAGE DEVICE ROTATION SPEED CONTROL APPARATUS AND METHOD

CROSS REFERENCE TO RELATED APPLICATIONS

This is a continuation of U.S. application Ser. No. 10/250,251 entitled, "Optical Storage Device Rotation Speed Control Apparatus and Method", which was filed on 2003 Jun. 18 now U.S. Pat No. 7,116,622 and is included herein by reference.

BACKGROUND

The present invention relates to a method and apparatus to control an optical storage device, and more particularly to a method and apparatus to control the spindle motor rotation speed of the optical storage device by detecting the armature currents of the spindle motor.

In the realm of optical storage devices there exists two major types of spindle motors. The first type is a three-phase motor, typically installed with a Hall sensor. Such motor can provide FG signal to indicate the rotation speed of the motor. Therefore the optical storage device can use the FG signal to know the current angular velocity of the motor and perform constant angular velocity (CAV) control to the motor. In addition, three-phase motors can rotate at very high speeds, so they are very popular in high-speed CD-ROM, CD-RW, and DVD-ROM applications. However, a major weakness of three-phase motors is that the motor itself, and its corresponding driving circuits, are rather expensive. Therefore, in most low-speed optical storage devices, such as DVD players and CD players, a DC motor is used as a spindle motor, so as to reduce the cost.

For optical storage devices using DC motors, there's no FG signal provided. The optical storage devices can only perform low speed constant linear velocity (CLV) control. Furthermore, because there is no easy way to sense the current angular velocity of the DC motor, it is difficult to control the deceleration rate and time before ejecting the optical medium from the optical storage device. Traditional control methods include using the optical pick-up of the optical storage device to read the timing information recorded on the optical medium, and calculating the DC motor rotation speed before performing the braking operation on the DC motor. Then, according to the calculated angular velocity of the DC motor, the system implements a constant deceleration for the corresponding period of time, causing the motor to stop spinning. Finally, the deceleration is stopped, and the ejection of the optical medium is performed. Under normal operation, this type of control method is capable of braking the medium-loaded optical storage device in a stable fashion. However, in some cases, the method will start ejection of the optical medium prior to complete deceleration of the DC motor, and cause damages to the surface of the medium. Such cases include:

1.) Erroneous calculation of the angular velocity of the DC motor. If the optical medium contains pre-existing and heavy damaged surface, the timing information recorded on the medium can not be properly read. The deceleration begins while the angular velocity of the DC motor is still unstable.
2.) Inconsistent loading of the spindle motor. For example, an 8 cm or a 12 cm optical disc, or optical discs of different thicknesses.
3.) Inherent inconsistent characteristics of the spindle motors. Same control currents applied to different spindle motors may lead to different deceleration operations.

SUMMARY

It is therefore an objective of the present invention to provide an apparatus and method that senses the armature current of the spindle motor to estimate the current angular velocity of the motor. The present invention calculates the angular velocity of the motor from the armature current, and then accurately controls the DC motor to a halt through a simple motor control circuit.

Briefly, the present invention provides a method for controlling angular velocity of a spindle motor, the method comprising generating a first control signal while in a first control mode, and generating a second control signal while in a second control mode; when receiving the first control signal in the first control mode, sending a first control voltage and a second control voltage to the spindle motor, causing the spindle motor to produce a first armature current upon reception of the first pulse and produce a second armature current upon reception of the second pulse; when receiving the second control signal in the second control mode, sending a third DC signal with a third control voltage to the spindle motor, causing the spindle motor to produce a third armature current upon reception of the DC signal; outputting a first, a second, and a third test voltage corresponding to the first, the second, and the third armature currents; using the first control voltage, the second control voltage and the third control voltage with the first, the second and the third test voltages to obtain a motor coefficient and a relative angular velocity of the spindle motor for controlling the angular velocity of the spindle motor.

The present invention further provides an apparatus for reproducing information on a medium, comprising a spindle motor for rotating the medium; a motor driving circuit for generating with a first control voltage to a spindle motor and causing the spindle motor to produce a first armature current, generating with a second control voltage to the spindle motor and causing the spindle motor to produce a second armature current, and generating a DC signal with a third voltage to the spindle motor and causing the spindle motor to produce a third armature current; a sensor circuit for sensing the first, the second, and the third armature currents, and generating a first, a second, and a third test voltage corresponding to the first, the second, and the third armature currents, respectively; wherein the first and the second test voltages are calculated to obtain a motor coefficient of the spindle motor; and wherein the third control voltage, the motor coefficient, and the third test voltage are calculated to obtain a relative angular velocity of the spindle motor for controlling the angular velocity of the spindle motor.

The present invention further provides a method for controlling angular velocity of a spindle motor to rotate a disc in a disc reproduction apparatus, the method comprising generating with a first control voltage and with a second control voltage to the spindle motor, causing the spindle motor to produce a first armature current upon reception of the first pulse and produce a second armature current upon reception of the second pulse; generating a third control voltage to the spindle motor, causing the spindle motor to produce a third armature current; sensing the first, the second, and the third armature currents, and outputting a first, a second, and a third test voltage corresponding to the first, the second, and the third armature currents; using the first and the second control voltages and the first and second test voltages to obtain a motor coefficient of the spindle motor; using the third control voltage, the motor coefficient, and the third test voltage to obtain a relative angular velocity of the spindle motor for controlling the angular velocity of the spindle motor.

It is an advantage of the present invention that it measures the armature current of a spindle motor to find an angular velocity of the spindle motor. By calculating a counter-electromotive force, and thus the angular velocity of the motor, according to the size of the armature current, and then using a simple motor control circuit, the present invention allows a deceleration control process to proceed in a closed-loop circuit, allowing for precise control of the DC motor to a complete stop.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
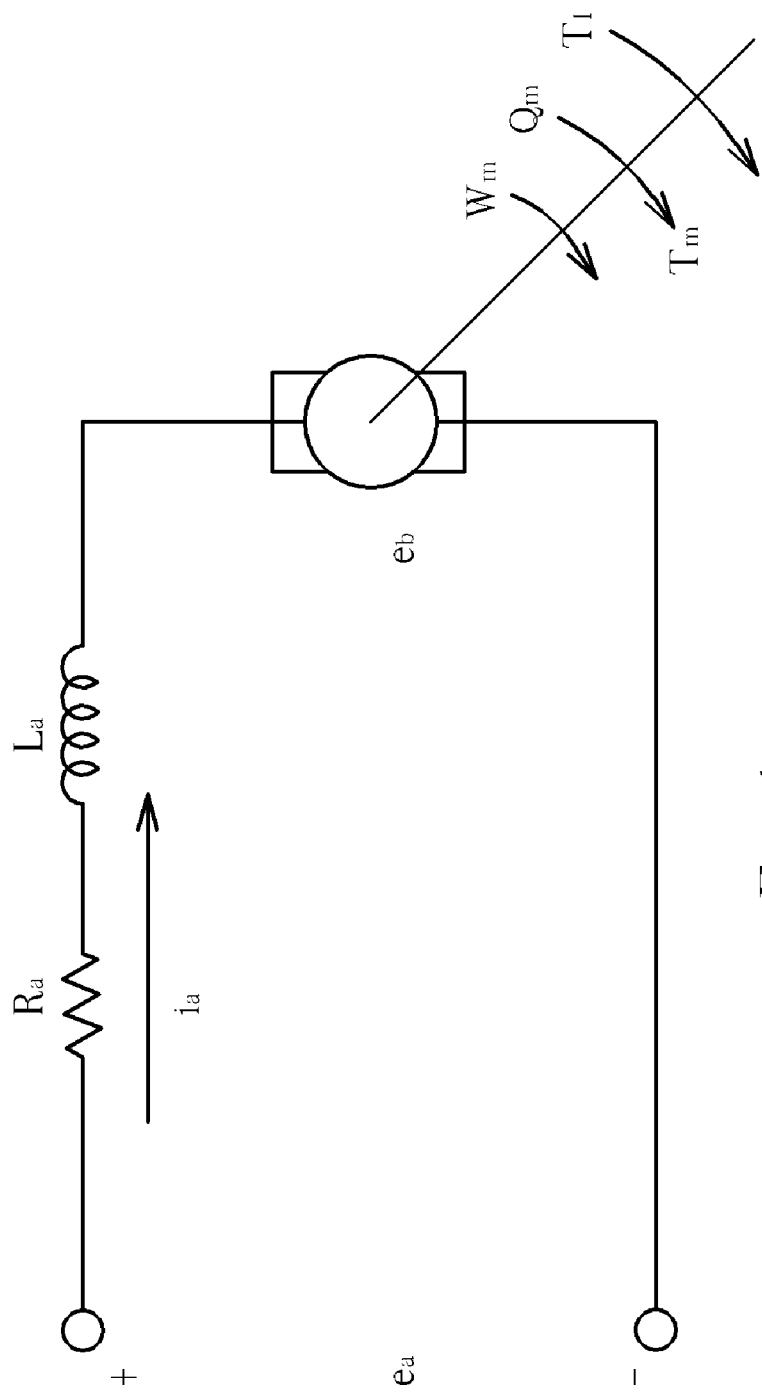
FIG. 1 shows a simplified model of a DC motor.

FIG. 1 shows a simplified model of a DC motor. From the simplified model, the following equalities can be obtained:

$$\frac{di_a(t)}{dt} = \frac{1}{L_a}e_a(t) - \frac{R_a}{L_a}i_a(t) - \frac{1}{L_a}e_b(t) \quad (1)$$

$$T_m(t) = K_i i_a(t) \quad (2)$$

$$e_b(t) = K_b w_m(t) \quad (3)$$

where $i_a(t)$ is the armature current, $R_a$ is the armature resistance, $e_a(t)$ is the armature voltage, $L_a$ is the armature inductance, $e_b(t)$ is the counter-electromotive force (CEMF), $K_i$ is the torque coefficient, $T_m(t)$ is the motor torque, $K_b$ is the CEMF constant, $w_m(t)$ is the armature angular velocity, and $T_L(t)$ is the load torque.

From equation (3), it can be seen that the armature angular velocity $w_m(t)$ is directly proportional to the CEMF $e_b(t)$. According to equation (1), if the armature voltage $e_a(t)$ is known, the relative value of the current motor armature angular velocity $w_m(t)$ can be obtained via the armature current $i_a(t)$.

Figure 3:
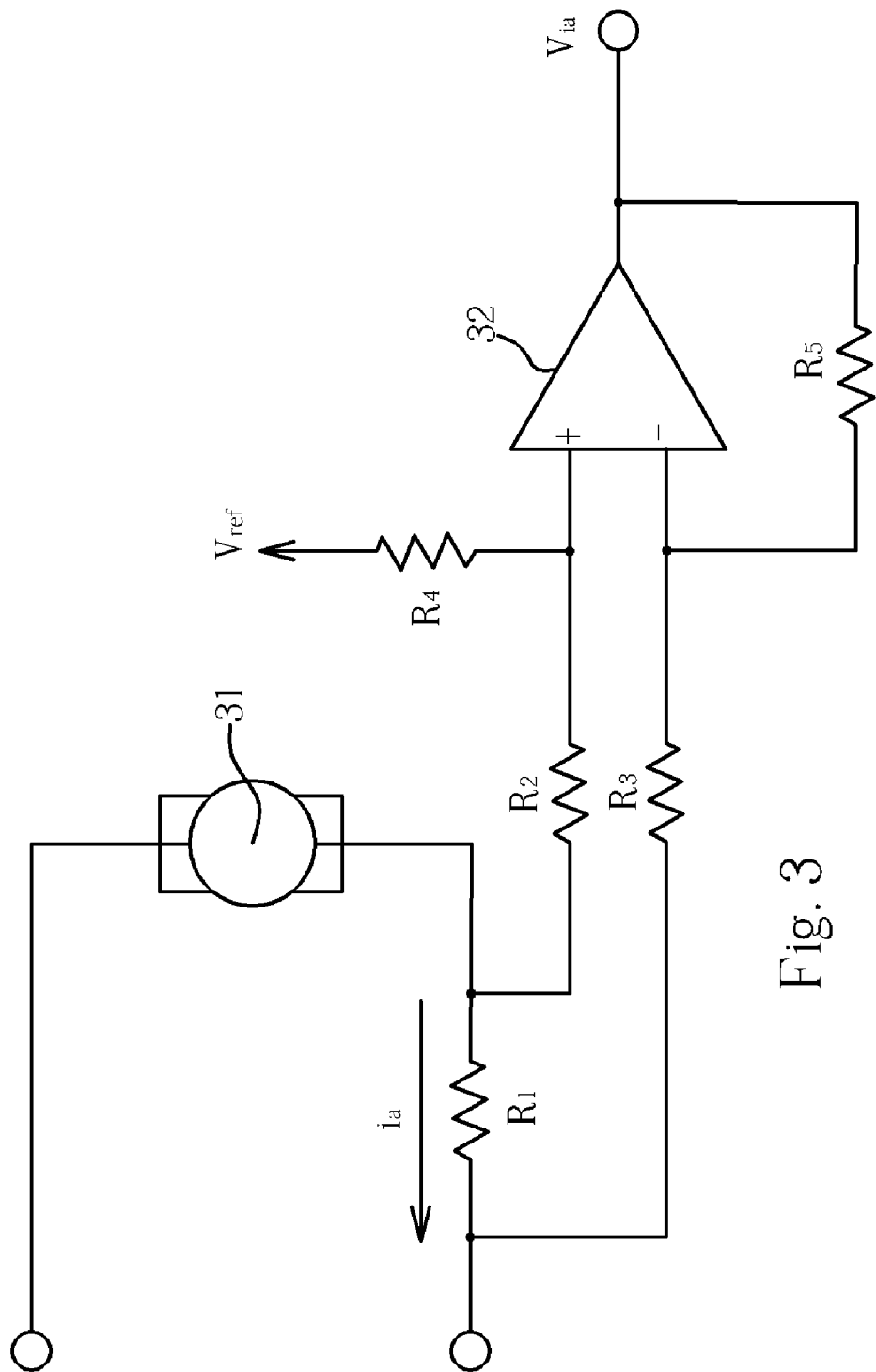
FIG. 3 shows an armature current sensor circuit according to the present invention.

FIG. 3 shows an armature current sensor circuit according to one preferred embodiment of the present invention. The sensor circuit comprises five resistors ($R_1$, $R_2$, $R_3$, $R_4$, $R_5$), and an operational amplifier (OPAMP) 32. The circuit is used to measure the armature current $i_a$ produced by the spindle motor 31. Resistor $R_1$ and the spindle motor 31 are connected in series. Resistors $R_2$ and $R_3$ are connected at one end to either end of resistor $R_1$, and at another end to the non-inverting input and inverting input of the OPAMP 32, respectively. Resistor $R_4$ is connected from the non-inverting input of the OPAMP 32 to a reference voltage $V_{ref}$. Resistor $R_5$ acts as a negative feedback and is connected from the output of the OPAMP 32 to the inverting input of the OPAMP 32. The output of the OPAMP 32 is a test voltage $V_{ia}$.

In this embodiment, the resistance of resistors $R_2$ and $R_3$ is much larger than the resistance of resistor $R_1$. Therefore, the current through resistor $R_1$ is approximately equal to the current through the spindle motor 31, and is thus treated as $i_a(t)$. Due to the armature current sensor circuit described above, we can derive the following relation:

$$V_{ia} = V_{ref}\frac{R_2}{R_2+R_4}\frac{R_3+R_5}{R_3} + V_+\frac{R_4}{R_4+R_2}\frac{R_3+R_5}{R_3} - (V_+ - i_a R_1)\frac{R_5}{R_3}$$

where $V_+$ is the voltage at the node connecting $R_1$ and $R_2$. With $R_2=R_3=K_1$ and $R_4=R_5=K_2$, the relationship between $V_{ia}$ and $i_a$ can be simplified as:

$$V_{ia} = V_{ref} + \frac{K_2}{K_1}(i_a R_1)$$

Therefore, we can find the armature current from the magnitude of $V_{ia}$.

Here, the value of $V_{ref}$ can be modified such that the output voltage $V_{ia}$ falls within the input voltage range of the analog-to-digital converter in the angular velocity control circuit (explained below) that receives the output voltage $V_{ia}$.

Additionally, in the armature current sensor circuit described above, generally speaking, because the inductance of the spindle motor is not large, the armature current can settle very quickly, so in practical use, equation (1) can be simplified as:

$$e_b(t) = e_a(t) - R_a i_a(t) \quad (4)$$

Knowing that the motor armature angular velocity $w_m(t)$ is directly proportional to the CEMF $e_b$, in practical use, we need not measure the actual armature voltage and current. Instead, we can use the control voltage (DMOLVL) of the motor driving circuit (explained below) in substitute for the armature voltage, and use the test voltage $V_{ia}$ outputted by the armature current sensor circuit in substitute for the armature current, and enter a motor coefficient $K_{ia}$ to get the following relationship:

$$w_m(t) \propto (DMOLVL - K_{ia}V_{ia}(t)) \quad (5)$$

The motor coefficient $K_{ia}$ used here is related to the internal resistance of the motor and special characteristics involved in producing the armature current. So, we must measure the motor coefficient either before velocity measurement begins, or directly after turning on the power supply. The method of finding the motor coefficient $K_{ia}$ is to send two pulses of voltages $V_1$ and $-V_2$ to the motor in a very short period of time. Because the duration of the pulses is very short, we can assume that in this time, the angular velocity of the motor does not change, and can therefore derive the following relationship:

$$V_1 - K_{ia}V_{ia1} = -V_2 - K_{ia}V_{ia2} \quad (6)$$

where $V_{ia1}$ and $V_{ia2}$ represent the voltages outputted by the armature current sensor circuit when producing pulses $V_1$ and $-V_2$, respectively.

From equation (6), we can find the following equation for the motor coefficient:

$$K_{ia} = \frac{V_1 + V_2}{V_{ia1} - V_{ia2}} \quad (7)$$

Therefore, substituting the motor coefficient found from equation (7) and the known control voltage DMOLVL into equation (5), we can find the relative value of the motor armature angular velocity $w_m(t)$.

Figure 2:
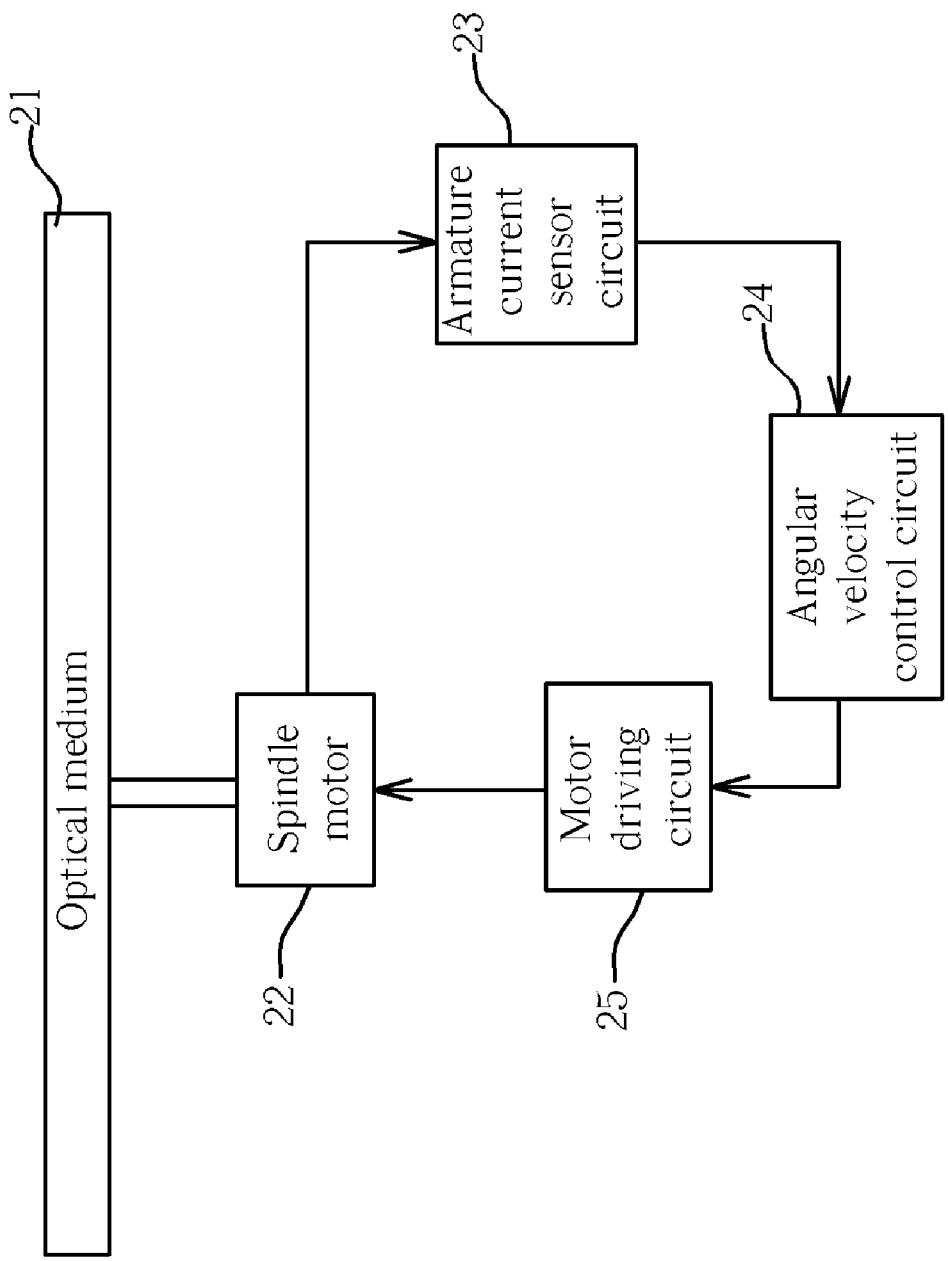
FIG. 2 shows a circuit block diagram of an optical storage device angular velocity control apparatus according to the present invention.

FIG. 2 shows a circuit block diagram of an optical medium angular velocity control apparatus according to the preferred embodiment. This apparatus uses the principles and the armature current sensor circuit described above. This apparatus is used to control the actual angular velocity of the spindle motor 22. The spindle motor 22 spins an optical medium 21, and uses optical pick-up to read information stored in the medium 21. The apparatus comprises an armature current sensor circuit 23, an angular velocity control circuit 24, and a motor driving circuit 25.

The angular velocity control circuit 24 produces a first control signal while in a first control mode, and a second control signal while in a second control mode. The first control mode can find the motor coefficient, according to the principle described above in equation (7), when the power is turned on or right before deceleration begins. The second control mode is used to perform deceleration.

In the first control mode, the motor driving circuit 25 receives a first control signal and sends the first pulse of the first control voltage $V_1$ and the second pulse of the second control voltage $-V_2$ to the spindle motor 22, causing the spindle motor 22 to produce the first armature current and the second armature current upon receiving the first pulse and the second pulse, respectively. In the second control mode, the motor control circuit 25 receives a second control signal and produces a DC signal of the voltage DMOLVL, causing the spindle motor 22 to produce the third armature current upon reception of the DC signal.

The armature current sensor circuit 23 measures the first, second, and third armature currents, mentioned above, and outputs the proportional first test voltage $V_{ia1}$, the second test voltage $V_{ia2}$, and the third test voltage $V_{ia3}$, respectively.

In this manner, the angular velocity control circuit 24, according to equation (7), uses the ratio of the sum of the control voltages $V_1$ and $V_2$ to the difference of the test voltages $V_{ia1}$, and $V_{ia2}$ to find the motor coefficient $K_{ia}$ of the spindle motor. The control circuit 24 then, according to equation (5), takes the difference of the control voltage DMOLVL and the product of the motor coefficient $K_{ia}$ and the third test voltage $V_{ia3}$ to find the relative armature angular velocity $w_m(t)$ of the spindle motor 22. In the second control mode, the angular voltage control circuit 24 uses the relative value of the spindle motor armature angular velocity $w_m(t)$ to change the third control signal and adjust the control voltage DMOLVL, changing the actual speed of the spindle motor 22.

Figure 4:
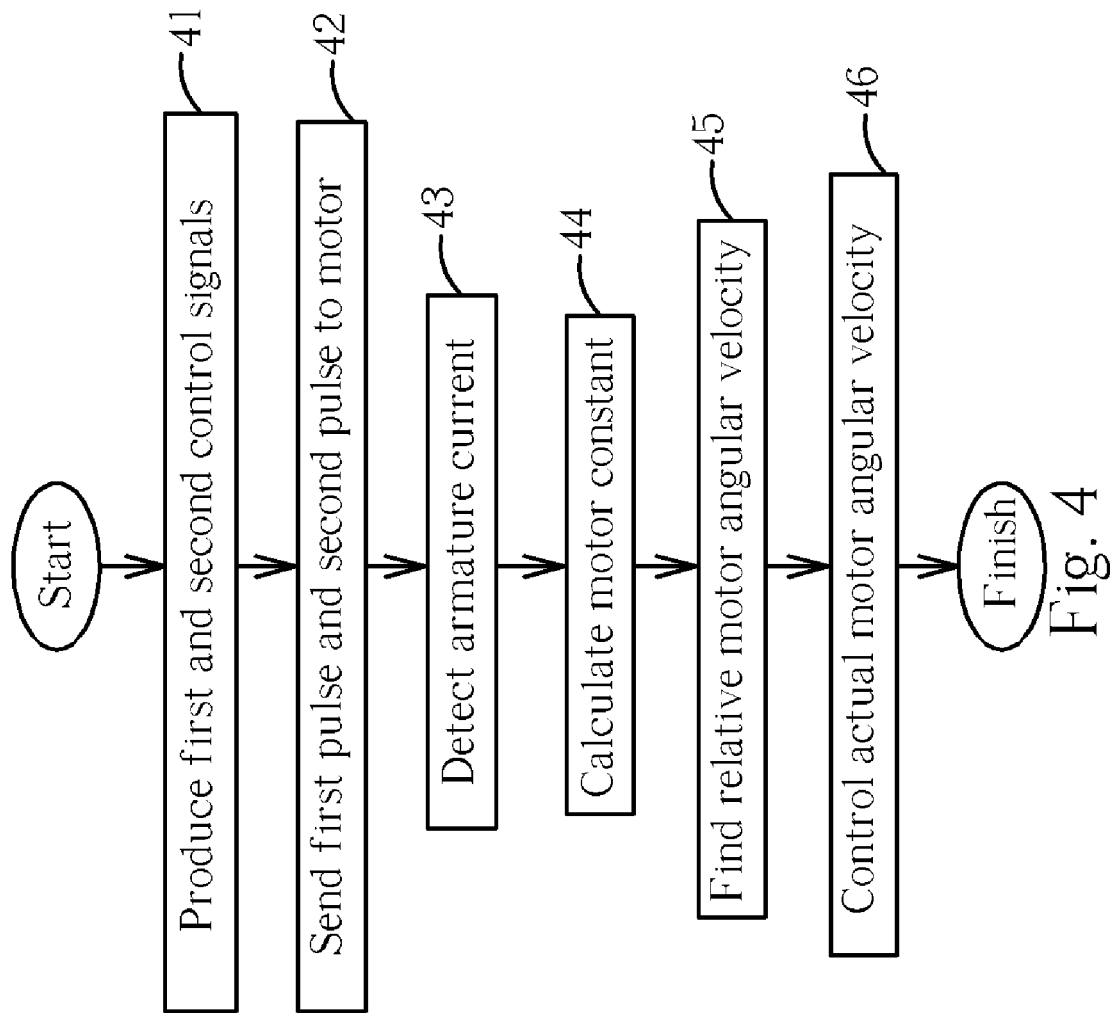
FIG. 4 shows a flow chart of an optical storage device angular velocity control method according to the present invention.

FIG. 4 shows a flow chart of a method of controlling an angular velocity of an optical medium, according to the preferred embodiment. First, in step 41, in a first control mode, produce a first control signal, and in a second control mode, produce a second control signal.

Then in step 42, in the first control mode, according to the first control signal, send a first pulse of a first control voltage, and a second pulse of a second control voltage to the spindle motor, to cause the spindle motor to produce a first armature current and a second armature current when receiving the first pulse and the second pulse, respectively. In the second control mode, according to the second control signal, produce a DC signal of a third control voltage to cause the spindle motor, upon reception of the DC signal, to produce a third armature current.

Then, in step 43, use an armature current sensor circuit, such as the one shown in FIG. 3, to sense the first, second and third armature currents, and output respective the first, second and third test voltages relative to the armature currents.

In step 44, take the ratio of sum of the first and second control votages to the difference of the first and second test voltages to find the motor coefficient of the spindle motor.

In step 45, proceed to take the difference of the third control voltage and the product of the motor coefficient and the third test voltage to find the relative armature angular velocity of the spindle motor.

In conclusion, the present invention provides a control apparatus and method that uses an armature current of a spindle motor to find the angular velocity of the spindle motor. According to the magnitude of the armature current, calculation of the CEMF, approximation of the motor angular velocity, and through use of a simple motor control circuit, the present invention can perform motor deceleration control in a closed loop, efficiently bringing the DC motor to a complete stop.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for controlling angular velocity of a spindle motor, the method comprising:

generating a first control signal while in a first control mode, and generating a second control signal while in a second control mode;

when receiving the first control signal in the first control mode, sending a first control voltage and a second control voltage to the spindle motor, causing the spindle motor to produce a first armature current upon reception of the first pulse and produce a second armature current upon reception of the second pulse;

when receiving the second control signal in the second control mode, sending a third DC signal with a third control voltage to the spindle motor, causing the spindle motor to produce a third armature current upon reception of the DC signal;

outputting a first, a second, and a third test voltage corresponding to the first, the second, and the third armature currents;

using the first control voltage, the second control voltage and the third control voltage with the first, the second and the third test voltages to obtain a motor coefficient and a relative angular velocity of the spindle motor for controlling the angular velocity of the spindle motor.

2. The method of claim 1 wherein the motor coefficient is found by taking a ratio of a sum of the control voltages to a difference of the test voltages.

3. The method of claim 1 wherein the relative angular velocity of the spindle motor is found by taking a difference of the third control voltage and the product of the motor coefficient and the third test voltage.

4. The method of claim 1 wherein a current sensor circuit is used to find the first, the second, and the third test voltages relative to the first, the second, and the third armature currents, respectively, the current sensor circuit comprising:
- a first resistor, connected in series with the motor;
- an operational amplifier;
- a second and a third resistor, the second resistor connected at a first end to a first end of the first resistor, and connected at a second end to the non-inverting input of the operational amplifier, and the third resistor connected at a first end to a second end of the first resistor, and connected at a second end to the inverting input of the operational amplifier; and
- a fourth and fifth resistor, the fourth resistor connected at a first end to the non-inverting input of the operational amplifier and at a second end to a reference voltage, and the fifth resistor connected at a first end to the inverting input of the operational amplifier and at a second end to an output terminal of the operational amplifier.

5. The method of claim 4 wherein the value of the second resistor is equal to the value of the third resistor; the value of the fourth resistor is equal to the value of the fifth resistor; and the value of the first resistor is different from the value of the second resistor.

6. An apparatus for reproducing information on a medium, comprising:
- a spindle motor for rotating the medium;
- a motor driving circuit for generating with a first control voltage to a spindle motor and causing the spindle motor to produce a first armature current, generating with a second control voltage to the spindle motor and causing the spindle motor to produce a second armature current, and generating a DC signal with a third voltage to the spindle motor and causing the spindle motor to produce a third armature current;
- a sensor circuit for sensing the first, the second, and the third armature currents, and generating a first, a second, and a third test voltage corresponding to the first, the second, and the third armature currents, respectively;
- wherein the first and the second test voltages are calculated to obtain a motor coefficient of the spindle motor; and
- wherein the third control voltage, the motor coefficient, and the third test voltage are calculated to obtain a relative angular velocity of the spindle motor for controlling the angular velocity of the spindle motor.

7. The apparatus of claim 6 further comprising an angular velocity control circuit, the angular velocity control circuit generating a first control signal while in a first control mode, generating a second control signal while in a second control mode, the motor driving circuit generating the first pulse and the second pulse when receiving the first control signal, and generating the DC signal when receiving the second control signal.

8. The apparatus of claim 7 wherein the angular velocity control circuit obtains the motor coefficient by taking a ratio of a sum of the first and the second control voltages to a difference of the first and the second test voltages.

9. The apparatus of claim 7 wherein the angular velocity control circuit obtains the relative angular velocity of the motor by taking a difference of the third control voltage and the product of the motor coefficient and the third test voltage.

10. The apparatus of claim 6 wherein the sensor circuit comprises:
- a first resistor connected in series with the motor;
- an operational amplifier;
- a second and a third resistor, the second resistor connected at a first end to a first end of the first resistor, and connected at a second end to the non-inverting input of the operational amplifier, and the third resistor connected at a first end to a second end of the first resistor, and connected at a second end to the inverting input of the operational amplifier; and
- a fourth and fifth resistor, the fourth resistor connected at a first end to the non-inverting input of the operational amplifier and at a second end to a reference voltage, and the fifth resistor connected at a first end to the inverting input of the operational amplifier and at a second end to an output terminal of the operational amplifier.

11. The apparatus of claim 10 wherein resistance of the second resistor is equal to resistance of the third resistor; resistance of the fourth resistor is equal to resistance of the fifth resistor; and resistance of the first resistor is different from the resistance of the second resistor.

12. A method for controlling angular velocity of a spindle motor to rotate a disc in a disc reproduction apparatus, the method comprising:
- generating with a first control voltage and with a second control voltage to the spindle motor, causing the spindle motor to produce a first armature current upon reception of the first pulse and produce a second armature current upon reception of the second pulse;
- generating a third control voltage to the spindle motor, causing the spindle motor to produce a third armature current;
- sensing the first, the second, and the third armature currents, and outputting a first, a second, and a third test voltage corresponding to the first, the second, and the third armature currents;
- using the first and the second control voltages and the first and second test voltages to obtain a motor coefficient of the spindle motor;
- using the third control voltage, the motor coefficient, and the third test voltage to obtain a relative angular velocity of the spindle motor for controlling the angular velocity of the spindle motor.

* * * * *